J. GÉRARD & A. TURNBULL.
FIRE APPARATUS.
No. 177,499. Patented May 16, 1876.
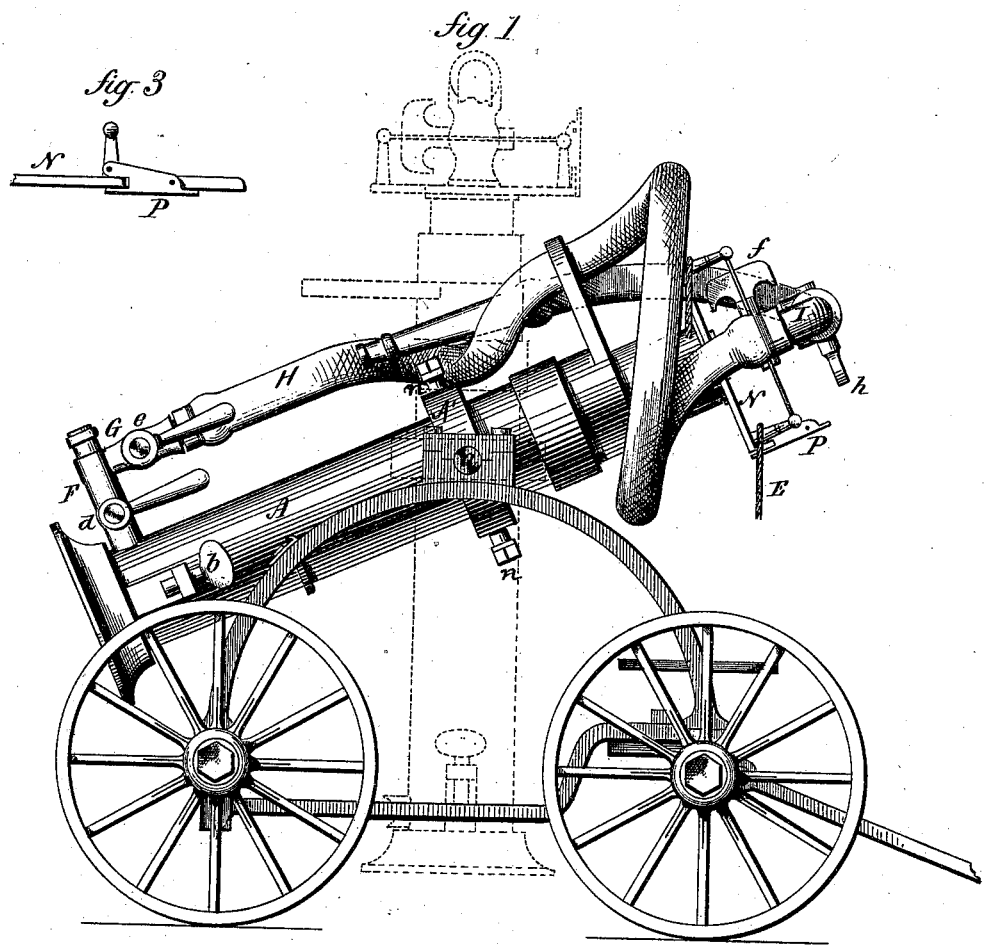
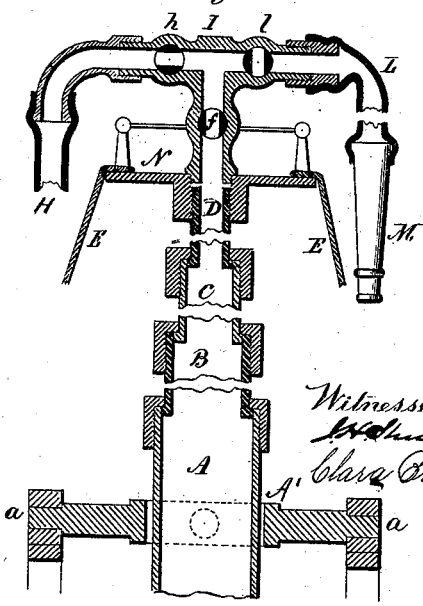
Witnesses.
W. Shumway
Clara Broughton
John Gérard &
Andrew Turnbull
Inventors
By Atty.
Jno. J. Earle

UNITED STATES PATENT OFFICE.

JOHN GÉRARD AND ANDREW TURNBULL, OF NEW BRITAIN, CONNECTICUT.

IMPROVEMENT IN FIRE APPARATUS.

Specification forming part of Letters Patent No. 177,499, dated May 16, 1876; application filed April 27, 1876.

*To all whom it may concern:*

Be it known that we, JOHN GÉRARD and ANDREW TURNBULL, both of New Britain, in the county of Hartford and State of Connecticut, have invented a new Improvement in Fire Apparatus; and we do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a central section of the upper portion of the apparatus; and in Fig. 3, a detached view.

This invention relates to the construction of an apparatus to be used as a substitute for ladders at fires, and like purposes. It consists, principally, in a telescopic column mounted on wheels for transportation, combined with a water-way to carry the water to the top of the column for distribution, and also for adjustment of elevation. The column consists in a series of cylinders, A B C D, more or less in number, arranged together in telescopic form, and so as to be extended one from the other, the joint between each two packed so as to be water-tight. This column is mounted upon a truck and on trunnions $a$, so that the column may be turned into nearly horizontal position to diminish its extreme elevation when not in use, or set in an upright position, and secured by set-screws $b$, or otherwise, as indicated in broken lines, Fig. 1.

The lower cylinder A is hung in a ring, A', from which the trunnions $a$ extend. This ring is of larger diameter than the cylinder. At right angles to the trunnions studs or internal trunnions $n$ extend to the cylinder, so as to form bearings upon which the cylinder may swing to the right or left. Hence, in case the truck should stand upon ground not perfectly level the cylinder could be tipped, turning on the trunnions $n$ until it be brought to the vertical position, and this adjustment made by the set-screws $b$. The trunnions $a$ allow the adjustment in the transverse position. Hence, because of hanging the cylinder in the ring A', the universal adjustment is secured. Guys E are provided for supporting the column when elevated. F is a water-inlet opening into the lower section A of the column, and to which the supply is attached. $d$ is a cock to open or close the passage into the column. Outside the cock $d$, and from the same passage, is a branch, G, turning upward, and in which is a cock, $e$. From this branch G a hose, H, leads upward to a cross-pipe, I. This cross-pipe opens into the upper section D through a cock, $f$, and in the pipe I each side of the passage to the column there is arranged, respectively, cocks $h$ and $l$, and on the opposite end of the pipe I the leading hose L, with its nozzle M, is applied, as seen in Fig. 2. Around the top of the column there is a gallery, N, on which the fireman may stand, and from there direct the stream.

When it is desired to extend the column the fireman takes his place in the gallery, the cock $d$ being closed and the cock $e$ opened below, so as to permit the water or whatever it may be under pressure to flow through the hose H. He then opens the cocks $f$ and $h$, as indicated in Fig. 2, leaving the cock $l$ closed. Hence the water will flow down into the column, causing it to extend and raise the gallery, and when the desired elevation is attained the cock $f$ is closed. Then, the fireman opening the cock $l$, the water will flow out through the nozzle M under direction of the fireman, who may at any time change his elevation from his position in the gallery—as for instance, if he desires to descend he will close the cock $h$ and open the cock $f$. Then the weight of the column will force the water in the column out through the nozzle $m$, or, to rise higher, he will open the cocks $f$ and $h$ and close the cock $l$ to permit the water to flow into the column, as first described; or the column may be elevated by a person at the base opening the cock $d$ without the assistance of the man in the gallery.

The gallery and column serve, also, as a fire-escape, or as a means for entering buildings at an elevation, and for convenience of such passage to or from the burning building a folding bridge, P, is hinged to one side of the gallery, indicated in detached view, Fig. 3, as extended. When not required this may be turned up or onto the gallery, as indicated in Fig. 1.

We do not wish to be understood as broadly claiming the telescopic hydraulic elevator, as such we are aware is not new; but What we do claim is—

1. A column formed from a series of tubes of diminishing diameter, arranged one within the other, and extensible in telescopic form, constructed with a gallery at the top, and combined with a water-supply entering at the top, and suitable cut-offs to adjust the elevation of the column, substantially as specified.

2. A column formed from a series of tubes of diminishing diameter, arranged one within the other, and extensible in telescopic form, constructed with a gallery at the top, and combined with a water-supply entering at the top, and an exit with suitable cut-offs to adjust and fix the elevation of the column and then connect the supply with the exit, substantially as specified.

3. A column formed from a series of tubes of diminishing diameter, arranged one within the other, and extensible in telescopic form, constructed with a gallery at the top, and combined with a water-supply entering at the top, and suitable cut-offs to adjust the elevation of the column, and a truck for transporting the said column, substantially as described.

4. A column formed from a series of tubes of diminishing diameter, arranged one within the other, and extensible in telescopic form, constructed with a gallery at the top, and combined with a water-supply entering at the top, and suitable cut-offs to adjust the elevation of the column, and hung upon a truck so as to be turned out of the vertical position, substantially as described.

5. A column formed from a series of tubes of diminishing diameter, arranged one within the other, and extensible in telescopic form, constructed with a gallery at the top, and combined with a water-supply entering at the top, and suitable cut offs to adjust the elevation of the column, and the ring A' and trunnions $a$ and $n$, whereby the column is hung to and made adjustable relatively to the truck, substantially as described.

JOHN GÉRARD.
ANDREW TURNBULL.

Witnesses:
JOHN E. EARLE,
CLARA BROUGHTON.